US008306893B2

(12) United States Patent
Plunket

(10) Patent No.: US 8,306,893 B2
(45) Date of Patent: Nov. 6, 2012

(54) AUTOMATED SYSTEM FOR COMPILING A PLURALITY OF EXISTING MORTGAGE LOANS FOR INTRA-LOAN RESTRUCTURING OF RISK VIA CAPITAL INFUSION AND DYNAMIC RESETTING OF LOAN TERMS AND CONDITIONS

(75) Inventor: John Edward Plunket, Washington, DC (US)

(73) Assignee: CapStratix Capital, LLC, Alexandria, VA (US)

( * ) Notice: Subject to any disclaimer, the term of this patent is extended or adjusted under 35 U.S.C. 154(b) by 741 days.

(21) Appl. No.: 12/364,288

(22) Filed: Feb. 2, 2009

(65) Prior Publication Data
US 2010/0198743 A1    Aug. 5, 2010

(51) Int. Cl.
 *G06Q 40/00* (2006.01)
(52) U.S. Cl. .................... 705/36 R; 705/35
(58) Field of Classification Search .............. 705/35, 705/36 R, 38
See application file for complete search history.

(56) References Cited

U.S. PATENT DOCUMENTS

| 7,593,889 B2 * | 9/2009 | Raines et al. ............... 705/38 |
| 2004/0153384 A1 * | 8/2004 | Whipple et al. ............ 705/35 |
| 2008/0109347 A1 | 5/2008 | Pilcher et al. |

* cited by examiner

*Primary Examiner* — James Vezeris
(74) *Attorney, Agent, or Firm* — Patton Boggs LLP

(57) ABSTRACT

The CapStratix System operates on a plurality of existing loans (a "designated portfolio"), held by a regulated Lender, using a pool of capital which is available from unregulated Investors, to dynamically re-compute loan packages. The CapStratix System arranges for the disaggregation of a Lender's designated portfolio of Mortgage Loans, each into discrete note amounts, including an A Note and a "RenuNote", both (or all) secured by the same mortgage lien. This process facilitates the extension of the maturity dates of the loans, at new market pricing, and the restatement of other terms and conditions required for a successful sale of the RenuNote to an Investor, reducing Lender's assets and risk profile, thereby having a positive effect on a Lender's regulatory capital ratios, without requiring a change to the Borrower's ownership structure or risk exposure.

13 Claims, 14 Drawing Sheets

FIG. 6

EARNINGS ANALYSIS

Compare current period actual results with historical values. If unfavorable trends exist, ask for explanations.

| Current period | | | Liquidity Parameters | Historical | |
|---|---|---|---|---|---|
| Actual | Budget | Peer | Measure | Previous | Same period last year |
| | | | Interest income (TE)*/ average assets | | |
| | | | Interest expense/ average assets | | |
| | | | Net interest income/ average assets | | |
| | | | Noninterest income/ average assets | | |
| | | | Provision for loan loss/ average assets | | |
| | | | Net income before gains, losses, and taxes (TE)/ average assets | | |
| | | | Realized gains/losses on HTM and AFS securities/ average assets** | | |
| | | | Taxes and extraordinary items/average assets | | |
| | | | Net income/ average assets | | |

Compare actual results with budget and peer to see if bank is performing according to plan and in line with similar types of banks.

FIG. 7A

| CapStratix™ Supplemental Note Processor | Example Loan - Data Sets from Various Databases | | |
|---|---|---|---|
| Parameters & Variables | Example Loan | Lender | Investor | Borrower/Regulator |
| Senior Notes / % Xtended Loan | $31,515,713 / 63.0% | | | |
| RenuNote Face / Net RenuNote | $18,484,287 / $15454,240 | | | |
| Net RenuNote + Senior Notes | $45,969,952 (91.9% / 78.2%) | A | B | C |
| Loan Category | | | | |
| Select Data Set by typing 'A', 'B', 'C', or 'risk' here--> | a | A | B | C |
| | Data Set Name | Lender | Investor | Borrower/Regulator |
| Current Loan Parameters | | | | |
| Total Current Loan Balance | | $50,000,000 | $50,000,000 | $50,000,000 |
| *(Ungroup rows below if there is more than one current note)* | | | | |
| Spread on Current Loan | | 2.2500% | 2.2500% | 2.2500% |
| Rate Index for Xtended Term | LIBOR Swap Rate | 3.5000% | 3.5000% | 3.5000% |
| Market Parameters | | | | |
| Required Spread on Xtended Loan | | 4.0000% | 4.5000% | 3.7500% |
| Cap Rates / Discount Rate | | | | |
| Current Income Cap Rate | | 11.0% | 11.0% | 11.0% |
| Discount Rate for DCF | | 15.0% | 15.0% | 15.0% |
| Residual Cap Rate for DCF | | 10.0% | 10.0% | 10.0% |
| RenuNote Variables | | | | |
| % of Xtended Spread to New Senior Note(s) | | 31.2500% | 50.0000% | 50.0000% |
| Term of Xtended Loan | | 3 Years | 3 Years | 3 Years |
| Fee on Xtended Loan | | 1.5% | 1.5% | 0.0% |
| RenuNote Disproportionate share of Fee | | 213.7% | 200.0% | 200.0% |
| Required Minimum Total Return to Investor | | 25.0% | 25.0% | 25.0% |
| Required Minimum Current Yield to Investor | | 8.0% | 6.0% | 6.0% |

Collateral Valuation Variables

| | | | |
|---|---|---|---|
| Type of Income Valuation Algorithm *Fill in "cap" or "DCF" below* | | | |
| Income Cap or Discounted Cash Flow | DCF | DCF | cap |
| Which Year's Income to Cap *Fill in "LTM" or "1" below* | | | |
| Last Twelve Months or Year 1 Income | LTM | LTM | LTM |
| Cap Rates / Discount Rate | | | |
| Current Income Cap Rate | 11.0% | 11.0% | 10.0% |
| Discount Rate for DCF | 15.0% | 15.0% | 14.0% |
| Residual Cap Rate for DCF | 10.0% | 10.0% | 9.0% |
| Income from Collateral *Unhide rows below to enter projected income amounts* | | | |
| LTM | $5,516,774 | $5,516,774 | $5,516,774 |
| Year 1 | $4,829,936 | $4,829,936 | $5,114,049 |
| Year 2 | $4,974,834 | $4,974,834 | $5,267,471 |
| Year 3 | $5,124,079 | $5,124,079 | $5,425,495 |
| Year 4 | $5,431,523 | $5,277,801 | $5,588,260 |
| Year 5 | $5,757,415 | $5,436,135 | $5,755,908 |
| Collateral Value Payoff *Enter zero to allow collateral value to control payoff* | | | |
| Payoff Percentage override | 0.0% | 0.0% | 0.0% |

*FIG. 7B*

| Current Loan Parameters | | | | |
|---|---|---|---|---|
| | Total Current Loan Balance | $50,000,000 | $50,000,000 | $50,000,000 |
| Rate Index for Xtended Term | LIBOR Swap Rate | 3.5000% | 3.5000% | 3.5000% |
| RenuNote Variables | | | | |
| | Term of Xtended Loan | 3 Years | 3 Years | 5 Years |

FIG. 8A

| Market Parameters | | | |
|---|---|---|---|
| Required Spread on Xtended Loan | 4.0000% | 4.5000% | 3.7500% |
| Cap Rates / Discount Rate | | | |
| Current Income Cap Rate | 11.0% | 11.0% | 11.0% |
| Discount Rate for DCF | 15.0% | 15.0% | 15.0% |
| Residual Cap Rate for DCF | 10.0% | 10.0% | 10.0% |

FIG. 8B

Income Valuation Method DCF

Current Income Cap Rate 11.00%
Current Income Cap Rate applied to LTM

Discount Rate for DCF 15.00%
Residual Cap Rate for DCF 10.00%
Term of Xtended Loan 3 Years

| Current Valuation of Loan Collateral | Time Zero | Year 1 | Year 2 | Year 3 |
|---|---|---|---|---|
| DCF using Net Operating Income before Debt Service and Owner Expenses for Years 1 thru 3 | | $ 4,829,936 | $ 4,974,834 | $ 5,124,079 |
| Residual Value based on Year 3, capitalized at 10.00% | | | | 51,240,786 |
| Present Value of Collateral based on DCF | $ 45,022,447 | | | |

*FIG. 9*

Determination of RenuNote Amount

Method of Valuation: DCF using Net Operating Income before Debt Service and Owner Expenses for Years 1 thru 3

| | | |
|---|---|---|
| Total Current loan Balance | $ 50,000,000 | |
| Present Value of Collateral based on DCA | $ 45,022,447 | 111.1% DCF method |
| Current loan to Value Ratio | | 70.0% per FDIC regs |
| Regulatory loan to Value Ratio | $ 31,515,713 | |
| Regulatory loan Amount | $ 50,000,000 | |
| Total Current loan Balance, from above | (31,515,713) | |
| less: Regulatory loan Amount | | |
| RenuNote Amount | $ 18,484,287 | |

FIG. 10

Interest Rate Data

| | | Xtended Loan |
|---|---|---|
| Fixed or Floating | | float |
| Index Rate | LIBOR | 3.50% |
| Spread | | 4.00% |
| total interest rate | | 7.50% |

FIG. 11

Interest Rate Data

| | | Xtended Loan |
|---|---|---|
| Fixed or Floating | | float |
| Index Rate | LIBOR | 3.50% |
| Spread | | 4.00% |
| total interest rate | | 7.50% |
| | | |
| Total Interest Payment on Xtended Loan | | $ 3,750,000 |
| Amortization | | 0 |

*FIG. 12A*

| | | |
|---|---|---|
| Total Interest payment | $ | 3,750,000 |
| A Note interest spread @40.0%ofXtended Loan Spread | | 1.600% |
| Interest on A Note | | 5.100% |
| A Note Interest Payment | $ | 1,607,301 |
| Interest Payment to RenuNote | $ | 2,142,699 |
| Available Interest Spread to RenuNote | | 11.741% OK relative to minimum |

*FIG. 12B*

| Calculation of RenuNote Returns and Required Discount | Time Zero | Year 1 | Year 2 | Year 3 |
|---|---|---|---|---|
| RenuNote Face | $ (18,484,287) | | | |
| Fee to RenuNote | $ 412,137 | | | |
| Current Interest payments on RenuNote | | 2,142,699 | 2,142,699 | 2,142,699 |
| Principal Payments on RenuNote | | | | |
| Maximum Repayment to RenuNote Investor | | | | 18,484,287 |
| total Cash Flow to RenuNote Holder before discount | (18,072,151) | 2,142,699 | 2,142,699 | 20,626,986 |
| Total Equity Return to RenuNote before discount | 12.5% | | | |
| Required Discount to RenuNote Investor. Dollar amount | (4,425,648) | | | |
| = NPV of total cash flow, @ Required Minimum Total Equity Return (25.0%) | | | | |
| Required Discount to RenuNote Investor, as % of whole loan | 8.85% | | | |
| Total Cash Flow to RenuNote Holder AFTER discount | (13,646,503) | 2,142,699 | 2,142,699 | 20,626,986 |
| Total Equity Return to RenuNote after discount | 25.0% | | | |

*FIG. 13A*

| Calculation of RenuNote Returns and Required Discount | Time Zero | Year 1 | Year 2 | Year 3 |
|---|---|---|---|---|
| RenuNote Face | $ (18,484,287) | | | |
| Fee to RenuNote | $ 592,421 | | | |
| Current Interest payments on RenuNote | | 2,253,004 | 2,253,004 | 2,253,004 |
| Principal Payments on RenuNote | | | | |
| Maximum Repayment to RenuNote Investor | | | | 18,484,287 |
| total Cash Flow to RenuNote Holder before discount | (17,891,866) | 2,253,004 | 2,253,004 | 20,737,291 |
| Total Equity Return to RenuNote Investor before discount | 13.6% | | | |
| Required Discount to RenuNote Investor. Dollar amount | (4,030,048) | | | |
| = NPV of total cash flow, @ Required Minimum Total Equity Return (25.0%) | | | | |
| Required Discount to RenuNote Investor, as % of whole loan | 8.06% | | | |
| Total Cash Flow to RenuNote Holder AFTER discount | (13,861,818) | 2,253,004 | 2,253,004 | 20,737,291 |
| Total Equity Return to RenuNote after discount | 25.0% | | | |

*FIG. 13B*

AUTOMATED SYSTEM FOR COMPILING A PLURALITY OF EXISTING MORTGAGE LOANS FOR INTRA-LOAN RESTRUCTURING OF RISK VIA CAPITAL INFUSION AND DYNAMIC RESETTING OF LOAN TERMS AND CONDITIONS

FIELD OF THE INVENTION

This invention relates to the field of mortgage finance and, in particular, to a system for compiling a plurality of existing mortgage loans for intra-loan restructuring of risk via capital infusion and dynamic resetting of loan terms and conditions.

BACKGROUND OF THE INVENTION

Mortgage loans create additional liquidity in the real estate market and thereby support real estate property values and facilitate transactions. Increased liquidity lowers interest rates, allows for a greater number of transactions to occur, and affords larger loan amounts than otherwise possible. Notably, new mortgage transactions fund property acquisitions as well as the repayment of mortgage loans at or before their final maturity.

Since 1985, both the residential and commercial mortgage markets benefited in certain ways from new business methods that encouraged and enabled capital investors worldwide to fund mortgages without having property-specific knowledge at the once-standard level of detail. Through these new methods, investors could acquire publicly registered securities, the majority amount of such securities formally rated by third-party credit rating agencies ("CRAs"), such ratings in effect serving as a substitute for investors developing their own direct understanding of the overall level of investment risk. This mortgage "securitization" process, whereby pools of mortgage loans are funded by issuances of fixed income securities (i.e., mortgage-backed securities, a/k/a "MBS" for residential and "CMBS" for commercial), increased the supply of mortgage capital by bringing rated as well as unrated bond investors newly into the universe of mortgage investors. These bond investors entered the mortgage market because a.) the securitization methods provided a familiar form of investment (i.e., rated and unrated publicly registered bonds) which they could buy or sell in an established secondary trading market through trading desks at major investment banks, and track the market through various independent data services such as Bloomberg; b.) the securitization methods seemed to minimize if not eliminate exposure to property- and market-specific investment risk by having geographic and other types of diversity across loan pools; and c.) the securitization methods seemed to allow total investment risk to be quantified and rated by ostensibly expert independent agencies. Thus, initially and for several years through most of 2007, the methods seemed to make investments in pools of mortgage loans directly comparable to the entire universe of non-mortgage bond investments. As a direct result, during this period, residential and commercial mortgage loans became more available to average borrowers, generally bore lower interest rates, and were funded in higher amounts on a given property, relative to earlier periods. This occurred as a direct result of the acceptance of mortgage-backed securities as investment grade fixed income investment by investors who would not otherwise have provided anywhere near the same amount of capital to fund real estate industry mortgage demand.

Between 1989 and 2007, the mortgage market grew tremendously in terms of both the amount of capital invested in these pools of loans and the complexity of the securities issued by loan pool owners, in both MBS and CMBS categories. Predictably, increased liquidity drove total loan fundings up, both in aggregate and at the individual loan level, and drove interest rates down. The greater supply and lower cost of mortgage capital decreased real estate buyers' total cost of capital; a lower total cost of capital fueled a major upward trend in real property values.

In early 2007, with property values reaching historic highs and interest rate declining to historic lows, the CRAs as well as many investors became concerned that the CRA risk ratings as applied to previously issued mortgage-backed securities did not accurately reflect their true bond investment risk. By late 2007, this concern had become so prevalent and so acute that little if any new capital was flowing into the mortgage capital market, and trading of issued securities slowed markedly. Previous MBS and CMBS investments began dropping in value as a clear indication of this concern and the concomitant decrease in liquidity. In short order, the entire market of highly sophisticated mortgage-backed bond investors had re-evaluated their investment risk positions and came to understand two realities. First, they realized that, irrespective of the CRA ratings, their risk was inevitably and directly related to the value of the properties which served as ultimate security for the pooled loans; second, they realized that the scale and structural complexity of the mortgage pools supporting their bonds, and the total scale of the MBS and CMBS market, virtually precluded any definitive risk analysis updates. In plain terms, there was no practical way to "go back", gather up, and understand the property-specific knowledge they needed to assess their investment risk. The ensuing collapse of the mortgage-backed securities market and the weakening or failure of many related institutions began as a re-pricing of bond risk, proceeded to become a self-propelled cycle of devaluation in property values, and quickly brought about the current disastrous situation among the many financial institutions holding large portfolios of mortgage loans. In short, the current situation is defined by many financial institutions having to take into account severe losses in the value of their mortgage loan holdings and acute declines in the profitability of their lending operations to the point that the expenditure or investment of untold hundreds of billions of dollars of taxpayer capital appears necessary, over an indeterminable time period, to support or take over those institutions.

Many of the lending institutions referred to above are regulated or overseen by one or more of several government departments, public agencies, and regulatory bodies, including among others the U.S. Treasury ("Treasury"), the Federal Deposit Insurance Corporation ("FDIC"), the U.S. Securities and Exchange Commission ("SEC"), and the Financial Accounting Standards Board ("FASB") which sets Generally Accepted Accounting Policies ("GAAP"). We refer herein to each such institution as a "Lender". We refer to all the laws, regulations, guidelines, standards, and policies under which a Lender operates as "Regulations".

US Patent Application Publication No. 2008/0109347 (herein "the '347 Publication") dated May 8, 2008 discloses a system where a single new mortgage loan is computed to provide a requested level of financing. This system described a loan which is secured by a first mortgage that may be bifurcated into at least two promissory notes—a senior note and at least one junior, subordinated, "Hyper-Note". By the method described in the '347 Publication, the amounts, term, maturity, rates of interest, and amortization schedules of the first mortgage loan and the Hyper-Note can be iteratively determined according to a selected loan construction paradigm. It was through this system, or similar methods, that many individual loans were constructed between 1989 and 2007.

However, the system described in the '347 Publication only focuses on individual new loan originations and fails to address the complexity of many financing situations, such as the unanticipated problems related to today's severe capital market distress, and does not adequately take into account the regulatory environment in which most Lenders operate. In addition, the '347 Publication sets up as important premises that mortgage funds have historically been scarce, sources arcane, supply "lumpy", a situation the emerging CMBS marketplace was "only beginning" to change, in support of the assertion that the Hyper-Note method would facilitate loan originations.

In sharp contrast to the context of the '347 Publication, the reality of the current market is that the development and execution of securitization methods and systems (including the system described in the '347 Publication submittal) proceeded apace, demonstrably resulting in an excess of mortgage funding—at least as measured relative to the investment risk taken by investors funding those mortgages. Further, as noted above, such excess sparked investor recognition of the imperfections across the investment class, particularly in the structuring and rating of loan risk, and abandoned the MBS and CMBS market almost entirely. As of the date of this application, this investor exodus has directly and drastically reduced the amount of available mortgage capital, the number of transactions, and the potential loan amount for a given property. Indirectly, the dramatically lower liquidity in the mortgage capital market has disproportionately increased the cost of capital across the entire real estate sector. This higher cost of capital has reduced real estate asset values sharply, well beyond the discrete impact attributable to a cyclical economic slowdown. In a continuing vicious cycle, lower property values have made previously funded mortgage loans much riskier than they were at the time of origination, in terms of the most reliable risk index available within the real estate lending industry, i.e., the loan to value ("LTV") ratio.

More specifically, in the current market a Lender holding a substantial portfolio of mortgage loans faces intense challenges:

1. to maintain risk-based regulatory capital adequacy to accommodate growth, avoid contraction, and preclude government takeover;
2. to start making mortgage loans again, in order to re-establish normal profitable operations;
3. to support profitable relationships with Borrowers, not only without the capacity to make new loans, but further burdened by responsibilities to pursue a costly adversarial judicial process to resolve defaults on existing loans; and
4. to build the confidence of investors and depositors who have normally been low cost sources of capital for Lenders.

The current market also presents Borrowers with increasingly difficult challenges:

1. to find adequate replacement mortgage funds to meet contractual loan repayment obligations;
2. to secure sufficient equity capital to meet loan obligations and related guarantees;
3. to avoid the loss of their mortgaged properties through foreclosure, due to the unfortunate timing of their loan maturities relative to an extraordinary capital market anomaly, as compounded by a business cycle downturn; and
4. to preclude the adverse tax effects of foreclosure and debt forgiveness.

As noted previously, and perhaps most importantly, it is a direct reflection of all of the difficulties cited above that the current market requires the government, thus taxpayers, to fund or expose previously unthinkable amounts of capital in support of Lenders. Pointedly, the risk in such fundings by the government is effectively little different from the risks in the positions once taken—and now abandoned—by private investors funding into the mortgage capital market. Indeed, there is no practical way for the government, in its effort to support Lenders hobbled by their difficulties, to assess property-specific loan risks any better than private investors did when they invested in mortgage-backed securities.

Current mortgage market conditions pertinent to this description involve many factors which constrain the ability of a Lender on its own to offer a new capitalization option to a Borrower. Specifically, in the current market, many loans held by Lenders, particularly construction or similar bridge financings, have reached or will soon reach their final maturity. Because of the economic downturn, the greatly reduced supply of mortgage capital, the substantially increased cost of capital in the real estate industry, and the attendant sharp reduction in real property values, many such loans reflect a LTV ratio much higher than regulations allow, and often high enough to trigger asset impairment charges under GAAP. This will have significant adverse impacts on the Lender's income (i.e., as necessary loan loss reserves are established, with commensurate reductions of current income), on its regulatory capital (i.e., as retained earnings are reduced and risk-based capital ratios decline), on its liquidity (i.e., as SEC-required disclosures discourage deposits and investment in public shares) and, in short order, its market value and ability to survive as an independent institution without government support. These adverse impacts will continue and, in many cases, will increase if such loans are simply extended as-is. The impact from a designated portfolio of such loans (e.g., those with the earliest maturity dates, or the highest LTV ratios) may be disproportionately large.

More pointedly, where a large portfolio of such loans are judged highly likely to reach final maturity with no possibility of repayment, resulting in significant impairment and the mandatory establishment by the Lender of larger loan loss reserves, it is also highly likely that worse will follow. To wit, the Lender will soon be forced to choose between two alternatives which both make matters worse—either simple loan term extensions, unattractive because the loan will remain on the Lender's books at an unacceptable LTV ratio, or a program of foreclosures on the collateral. An extension of a loan with a LTV ratio higher than regulatory guidelines will have the adverse effect noted above. A foreclosure program is very expensive and highly distracting of management attention, as a threshold matter, but even worse will force the Lender to choose between holding the collateral assets as Other Real Estate Owned ("OREO") or quickly selling the foreclosed assets to third parties at sharply reduced market values from a disadvantageous negotiating posture. Under FDIC guidelines, the dollar amount of a Lender's OREO can have a greater adverse impact in its regulatory capital calculations than simply extending the loan. The result of either choice during the current period would likely be net additional operating losses, a compounding of the adverse regulatory capital impact, and an increased likelihood that government support or a takeover will be required.

It is worth noting further that reductions in a Lender's regulatory capital and incremental economic losses are often a matter of public record and typically a focus of avid media interest. Such publicity almost invariably results in a further loss of consumer confidence and withdrawals of cash from the Lender by its depositors. The combined effects of real economic losses and broad loss of depositor and investor confidence can easily result in a downward spiral into failure, at great expense to taxpayers. The cumulative effect of many such failures is a huge burden on government resources, and demonstrably has a marked adverse impact on the entire economy.

From the foregoing, there is clearly a need for a system that constructs multiple loan packages according to a paradigm which puts a large measure of property-specific loan risk into the hands of investors who are capable of making a proper assessment of that risk and funding new capital against that risk, for each and every loan involved, in a way that is consistent with regulations and which will at least supplement if not wholly supplant the indeterminate amount of capital otherwise required of the government and its taxpayers. The system would also need to mitigate specifically the component of loan risk related to Borrower repayment obligations occurring in periods of diminished mortgage capital supply and extraordinarily high mortgage capital costs.

More specifically, such a system needs to provide a way to extend existing loan maturities while taking fully into consideration: a.) the myriad of regulations affecting Lenders holding such loans; b.) the various property-specific risk factors associated with each loan; and c.) the availability of capital from sources who can understand each loan's risk factors adequately to price the investment of new capital within established mortgage amounts. By facilitating loan term extensions, effectively disaggregating the risks specific to each loan and matching appropriate new private capital from unregulated investors to the disaggregated risk positions, such a system allows Lenders to reduce their exposure to risk in their mortgage loan portfolio with a minimum amount of governmental capital, applied efficiently. Such a system also: a.) shifts Borrower repayment obligations to future periods of greater overall financial stability; b.) increases the total amount of private capital in the mortgage market; c.) facilitates a greater number of mortgage transactions; d.) supports higher loan amounts on a given property; and e.) reduces the cost of mortgage capital, thus the industry's total cost of capital. All of these results tend to normalize real estate values and enhance the capital adequacy of Lenders, as well as arguably easing the overall financial stability of the entire economy beyond the real estate industry. The system is useful not only during the current market tumult but also consistently through periods of economic growth and stable mortgage markets as an enhancement of prior securitization systems and techniques.

BRIEF SUMMARY OF THE INVENTION

The above-described problems are solved and a technical advance is achieved by the present Automated System For Compiling A Plurality Of Existing Loans For Intra-Loan Restructuring Of Risk Via Capital Infusion And Dynamic Resetting Of Loan Terms And Conditions (termed "the CapStratix System" or "the System" herein).

The CapStratix System operates on a plurality of existing loans in the portfolio of a Lender by making use of a pool of capital available from a consortium of one or more private, unregulated investors or government institutions (the "Investors"). (For simplicity of description, the term "Investors" as used herein is intended to encompass private, unregulated investors as well as government institutions [or agencies] or any other source of capital that can be envisioned. The government institutions are termed "unregulated" herein as not being subject to banking laws or accounting standards, for example, in the usual sense of the term.) The operation dynamically re-computes the terms and conditions for a plurality of existing loans, taking into consideration the plurality of factors associated with each existing loan as well as the entirety of the plurality of existing loans.

In its operation, the CapStratix System arranges for the disaggregation of a Lender's designated portfolio of mortgage loans, each into discrete note amounts, including at least an A Note and a "RenuNote", all such notes secured by the same mortgage lien. This facilitates the extension of the maturity of the whole loan at new market pricing such that borrowers bear an appropriate market-determined share of the costs and risks involved, and the replacement of Lender capital, otherwise invested in the riskiest portion of each such whole loan, with Investor capital properly suited to that highest level of loan risk. This has a positive effect on the Lender's risk profile—i.e., reducing the Lender's risk—and on Lender's regulatory capital as determined by established regulations, making more efficient use of the Lender's total risk-based capital, and in particular any established total loan loss reserves in its tiered risk-based capital calculation. The CapStratix System, thus, in many cases, can obviate a government takeover of the Lender and can minimize in other cases the amount of government capital, if any, required to capitalize the Lender adequately. Furthermore, the CapStratix System can avoid the complication of requiring significant change to the loan Borrower's property ownership structure, while affording each of those Borrowers, or affiliates, an opportunity to invest new capital by acquiring the RenuNote created within their respective mortgage loans.

The CapStratix System determines the amount of each RenuNote to be created and the price at which each RenuNote is to be sold to Investors, each of whom has the knowledge required to understand the real risk in particular categories of loans (e.g., by collateral type, location, size, maturity, LTV ratio, and the like, or any combination of factors). The CapStratix system also operates to ensure that each RenuNote created and sold is wholly compatible with its related A Note as components of the whole loan at its new pricing, maturity, and conditions (the "Xtended Loan").

For Investors prepared to acquire a portfolio of RenuNotes suited to a particular investment expertise, market knowledge, and risk tolerance, the CapStratix System can automatically generate a full specification of the RenuNote for each of a plurality of existing loans based on a mix of interrelated factors.

The CapStratix System provides specific benefits to a Lender by:
1. facilitating investments by Investors to reduce a Lender's loan portfolio risk profile and enhance Lender's capital adequacy;
2. aligning purposefully with regulations;
3. supporting profitable relationships with Borrowers and re-establish profitable ongoing operations;
4. avoiding the cost and disruption related to pursuing Lender's available remedies in loan defaults;
5. affording the Lender an ability at a low effective cost to "use" its loan loss reserve amounts in excess of the regulatory recognition limit of 1.25% of its "risk weighted assets"; and
6. re-establishing market confidence, critical to Lender's ability to attract deposits and other low-cost forms of capital.

In addition, the CapStratix System can be used by a Lender initially to identify existing loans which are suitable candidates for restructuring and to compile a list of such loans organized by criteria consistent with Investor characteristics, regulations, and other objectives. Either as an aid to management planning or as a system by which a Lender or regulator can organize and execute a set of private capital transactions, the CapStratix System directly assists Lenders and indirectly affords greater efficiency to any government capital ultimately deemed necessary by regulators.

The CapStratix System facilitates investment of new capital in the mortgage market by Investors who have not traditionally funded mortgage debt by providing such Investors unique benefits and inducements including:
1. a practical, systematic means to invest in such instruments reliably and comfortably in accordance with regulations;
2. investment efficiency achieved through the portfolio focus and reduced transaction cost load;
3. attractive risk-adjusted investment yields, consistent with the total returns they traditionally seek, enhanced by the greater investment security, i.e., within the first lien and with mortgage remedies; and
4. potentially significant optionality values, such as rights to purchase all related senior positions (i.e., A Notes and other notes senior to the RenuNotes), or to bid advantageously in any ultimate foreclosure sales.

The CapStratix System provides benefits to Borrowers by:
1. enabling a whole loan extension by the current Lender, in the absence of other willing Lenders prepared to provide Borrowers new funds to meet repayment obligations, greatly mitigating the risk of repayment obligations occurring in periods of low mortgage capital supply and high capital cost;
2. precluding an ill-timed, non-discretionary property sale or foreclosure, with related tax issues, legal issues, and costs;
3. allowing them the opportunity to invest their own capital in risk positions they understand better than anyone else (i.e., the highest risk portion of their own mortgage loans); and
4. affording them time beyond the period of economic downturn to work on building property income, gaining operating efficiencies, etc.

The CapStratix System provides benefits to Regulators, in particular government departments and agencies using taxpayer capital, by:
1. providing a clear and consistent methodology for disaggregating and pricing each loan's RenuNote, encompassing each loan's highest risk component;
2. facilitating the investment of new private capital, at competitive market terms, into the mortgage capital market;
3. minimizing the amount of government capital required to support any Lender; and
4. by extension, minimizing the total amount of government capital required system-wide.

The CapStratix System accomplishes the above results for the four identified parties—Lenders, Investors, Borrowers, and Regulators—to enable a dynamic resolution of the loan restructuring in response to the market forces exerted by those parties on each other. The CapStratix System is used in this environment to dynamically compute a RenuNote for each of a plurality of existing loans, using the plurality of factors associated with each existing loan as well as the entirety of the plurality of existing loans which are reconciled with the Investor's interest in particular categories of loans (e.g., by collateral type, location, size or degree of distress, or any combination of factors).

BRIEF DESCRIPTION OF THE DRAWINGS

FIG. 6 illustrates, in block diagram form, a set of criteria relating to Lender Earnings Analysis;

FIGS. 7A and 7B illustrate a spreadsheet example of a loan analysis;

FIGS. 8A and 8B illustrate a spreadsheet example of an input screen and market parameters for the RenuNote using a revised term;

FIG. 9 illustrates a spreadsheet example of a determination of the appraiser's valuation of the property;

FIG. 10 illustrates a spreadsheet example of a determination of the RenuNote amount;

FIG. 11 illustrates a spreadsheet example of a determination of the Xtended Loan interest rate;

FIGS. 12A and 12B illustrate a spreadsheet example of a determination of the total interest on the Extended Loan, as well as the shares allocated to each Note; and FIGS. 13A and 13B illustrate two spreadsheet examples of a determination of the returns associated with the Xtended Loan.

DETAILED DESCRIPTION OF THE INVENTION

Real-Estate Financing Basics

Figure 1:
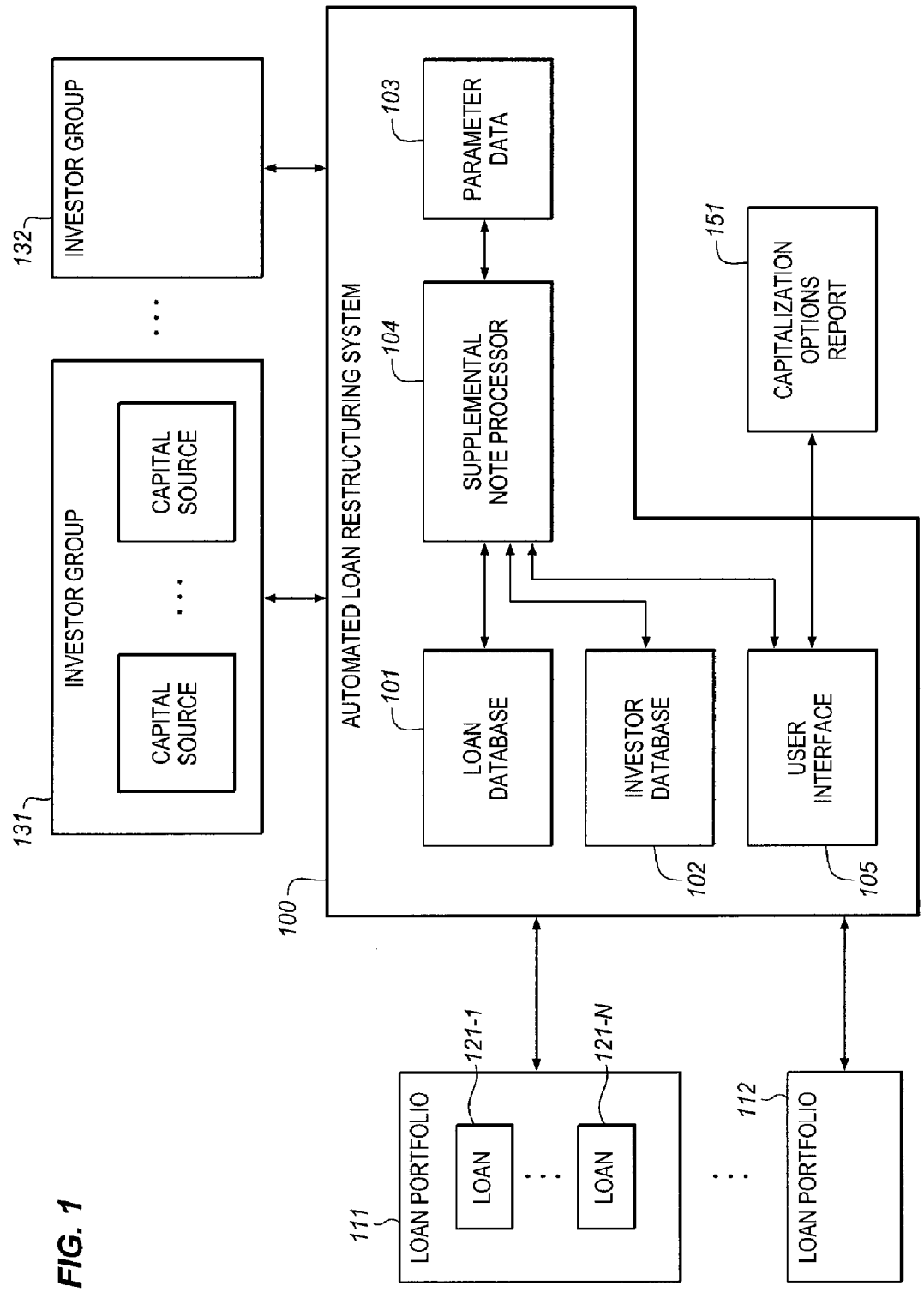
FIG. 1 illustrates, in block diagram form, the overall architecture of the present CapStratix System.

Loans secured by real estate include residential and commercial mortgage loans, as reflected in FDIC and related regulations. Residential loans are usually secured by a single family home mortgage and are repaid by an individual or family. The economic support of a residential loan is generally the personal income generated by the Borrower's individual or family income, with the mortgage—a property title conveyance, or deed of trust—to the Lender, conditioned on a failure to repay the loan timely and in full. Residential loans are also guaranteed by personal recourse to the assets of the Borrower in that the Lender has rights to all other assets of the Borrower. In contrast, commercial mortgage loans are principally secured by the Borrower's real property, typically income-producing properties such as office buildings, shopping centers, apartment complexes, industrial parks, and hotels. The economic support for a commercial mortgage loan is the strength of a property's ability to generate income from tenants or hotel guests. Commercial mortgage loans can have additional recourse to the assets of the Owner/Borrower beyond the property but are frequently only secured by the deed of trust.

On the supply side, loans can be constructed in a variety of ways to satisfy numerous Lender interests and governmental regulations. The Lender generally seeks to create loans that maximize their return, in the form of an interest rate, while mitigating the risk of loan default and loss potential. In the commercial real estate industry, where mortgage loans are secured by income-producing properties (e.g., office buildings, shopping centers, apartments, hotels, etc.), risk and loss potential are primarily mitigated by a number of factors including, but not limited to, the strength of a property's income (i.e., debt service coverage ratio or "DSCR"), the size of the loan relative to a property's value (i.e., "LTV"), and the rate at which the loan is repaid (i.e., amortization schedule).

On the demand side, Borrowers can have various objectives which depend on their varied business and personal needs. Some Borrowers (e.g., publicly traded REITs) usually prefer low leverage to maximize cash flow after debt service available for shareholder dividends. Other Borrowers (e.g., private entrepreneurs) often seek maximum leverage to reduce the amount of equity they have to invest in a given property acquisition transaction or, in the case of a refinancing, to recoup profits without selling the mortgaged property. Importantly, Borrowers refinancing usually seek a new loan sufficient to cover at least the outstanding balance of loan to be refinanced, especially during periods when capital market conditions limit the availability of new equity capital.

A loan used in the purchase of real estate typically is represented by an underlying security called a mortgage. The mortgage (which is a temporary, conditional pledge of property to a creditor as security for performance of an obligation or repayment of a debt) is generally associated with one or more promissory notes which are agreements between the Lender and the Borrower describing the parameters for the loan—e.g., loan amount(s), loan term(s), interest rate(s), amortization schedule(s), etc. The loan can be constructed according to one or more loan paradigms that provide one or more loan parameters.

Lenders charge an interest rate and require a total return that is attractive relative to the risk encompassed in the loan's probability of default and loss severity profile as of the date of loan origination. This economic risk encompasses: 1) the extent to which interest may not be paid in full on a timely basis, and 2) the extent to which full and timely repayment may not be made by the Borrower or ultimately satisfied out of foreclosure sale proceeds. High LTV ratio loans, where an Owner has relatively little cash or economic equity invested in a property, have inherently more risk for Lenders than low LTV ratio loans, as reflected particularly in regulations related to loan loss reserve requirements. Consequently, Lenders generally avoid making such high LTV loans and seek interest rates scaled to LTV as economic compensation for such risk.

The probability of a loan defaulting and the likely severity of loss to the Lender reflects a number of factors. The most important factor in total dollar terms is the value of the mortgaged property, which generally determines both a.) the amount of debt funding available to the Borrower as a source of repayment for the loan at its final maturity date, and b.) the amount of sale proceeds available to the Borrower as a source of repayment or to the Lender in a sale of a foreclosed property.

During the current period, with the value of most commercial real estate severely reduced (a result of economic recession, compounded by the capital market anomaly), there is both a high probability of default and a high probability of severe loss to the Lender. This is reflected in current LTV ratios, which are quite often a.) much above the LTV ratios determined as of loan origination dates; b.) not in compliance with FDIC loan guidelines (often exceeding 100%); and, thus, c.) an imperative to substantially increase loan loss reserves. Increasing reserves reduces current income or creates operating losses, slowing or reversing the growth of a Lender's regulatory capital, in many cases to the point where Lenders need new capital to maintain adequate FDIC capital ratios, or even simply to continue functioning as a Lender without regulatory relief or investment of public capital (i.e., a bailout).

All actual losses first affect the most junior note within a mortgage loan, such as a RenuNote. For this higher risk, a RenuNote Inventors likely will demand a higher financial return, consistent with returns set by competition among Investors in the market.

Regulatory Environment

Laws and regulations govern many aspects of banking. Matters such as who owns, controls, and manages Lenders; how much Lenders can lend to a single Borrower or group of Borrowers; how much capital Lenders should have; where Lenders can locate their offices; and what services Lenders can provide are all addressed by banking laws and regulations. In addition, under the Uniform Financial Institutions Rating System, the regulatory agencies evaluate and rate a Lender's financial condition, operational controls, and compliance in a number of areas. These areas are Capital, Asset Quality, Management, Earnings, Liquidity, and Sensitivity to market risk. Each of these components is viewed separately and together to provide a summary picture of a Lender's financial soundness.

Liquidity

Lender liquidity refers to the ability of a Lender to quickly raise cash at a reasonable cost. Lenders must have adequate liquidity in order to serve their customers and to operate efficiently. Those with adequate liquidity are able to pay creditors; meet unforeseen deposit runoffs; accommodate sudden, unexpected changes in loan demand; and fund normal loan growth without making costly balance sheet adjustments. Lenders with poor liquidity may not be able to meet these funding demands and in extreme cases may be closed. Lender assets are storehouses of liquidity and, theoretically, any asset item can serve as a liquidity source. How well a particular asset serves in this capacity depends upon the length of time it takes to dispose of it and the price the asset brings when it is sold. During normal market periods, assets, such as Loans, that can be sold quickly without any appreciable loss to the Lender are ideal candidates for meeting unexpected liquidity demands. During the current period of severe distress, Loans (or interests therein) that can be sold at any price are as a practical matter suitable candidates for meeting liquidity—or regulatory capital—demands.

Figure 3:
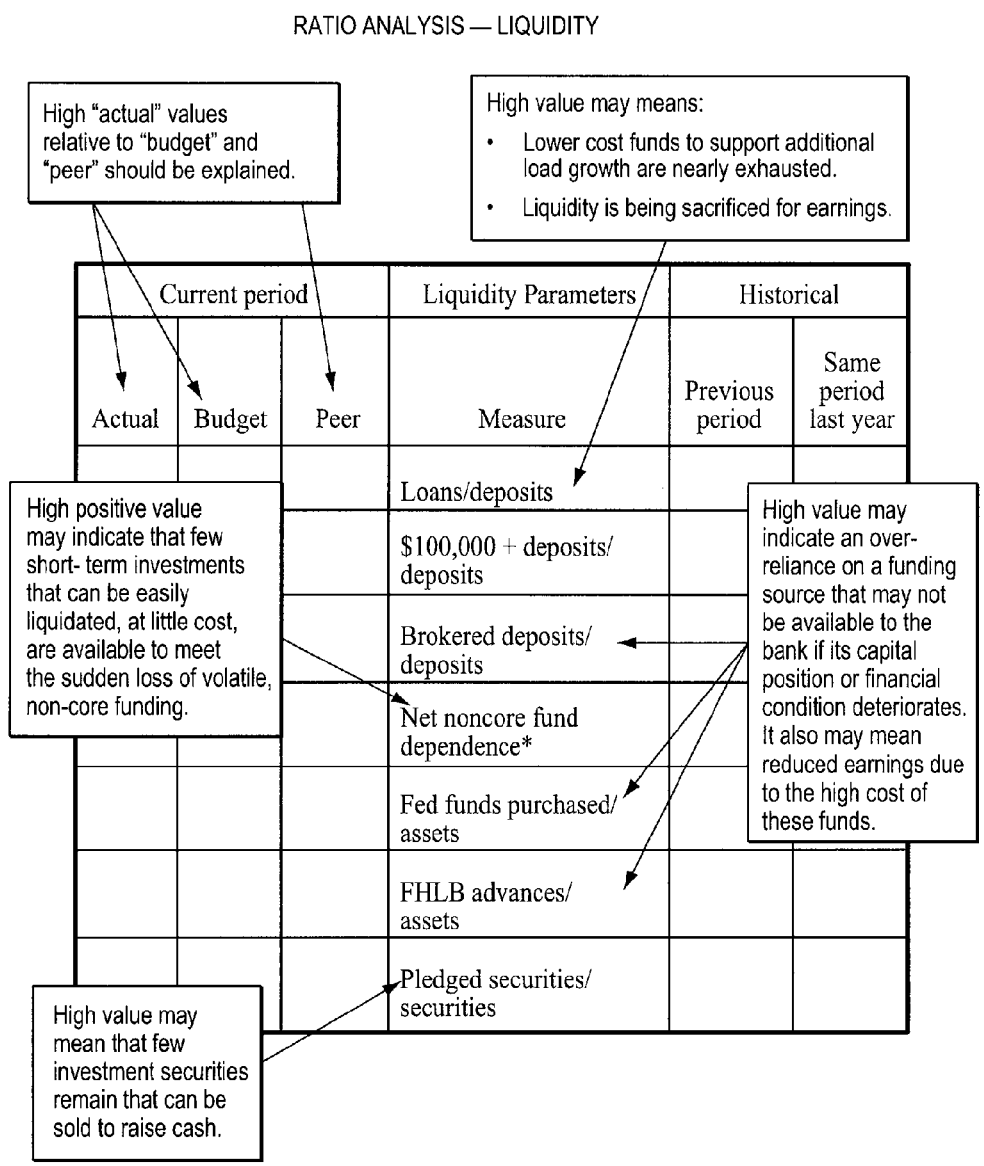
FIG. 3 illustrates, in block diagram form, a set of criteria relating to Lender Liquidity Analysis.

In reviewing a Lender's portfolio of existing loans, the Liquidity Parameters listed in FIG. 3 use the identified Loan data to enable the CapStratix System 100 to chart the Liquidity Parameters for various periods of time. These computed Liquidity Parameters are indicators of the financial health of the Lender and are pertinent to the determination of which and how many loans in the existing loan portfolio should be restructured.

Lender Capital

Lender Capital serves the same purposes as capital in any other business. It is the cushion that protects a Lender against unanticipated losses and sustains it through poor economic times. Likewise, Lender Capital is the pocket of funds that gives creditors comfort that their debts will be repaid. Since capital represents the shareholders' investment and appreciation in that investment from successful operations, it is also the shareholders' "stake put at risk," lessening incentives for taking unwarranted or uncompensated chances in operating the Lender. Different industries have varying needs for capital. Relative to nonfinancial businesses, Lenders and other financial service providers operate with small amounts of capital. Currently, the federal banking agencies use a "risk-based" approach to gauge Lender Capital. Under this approach, the agencies define what is to be included in Lender Capital and establish the minimum capital a Lender must have to protect it, primarily from the inherent risk in its asset holdings.

Figure 4:
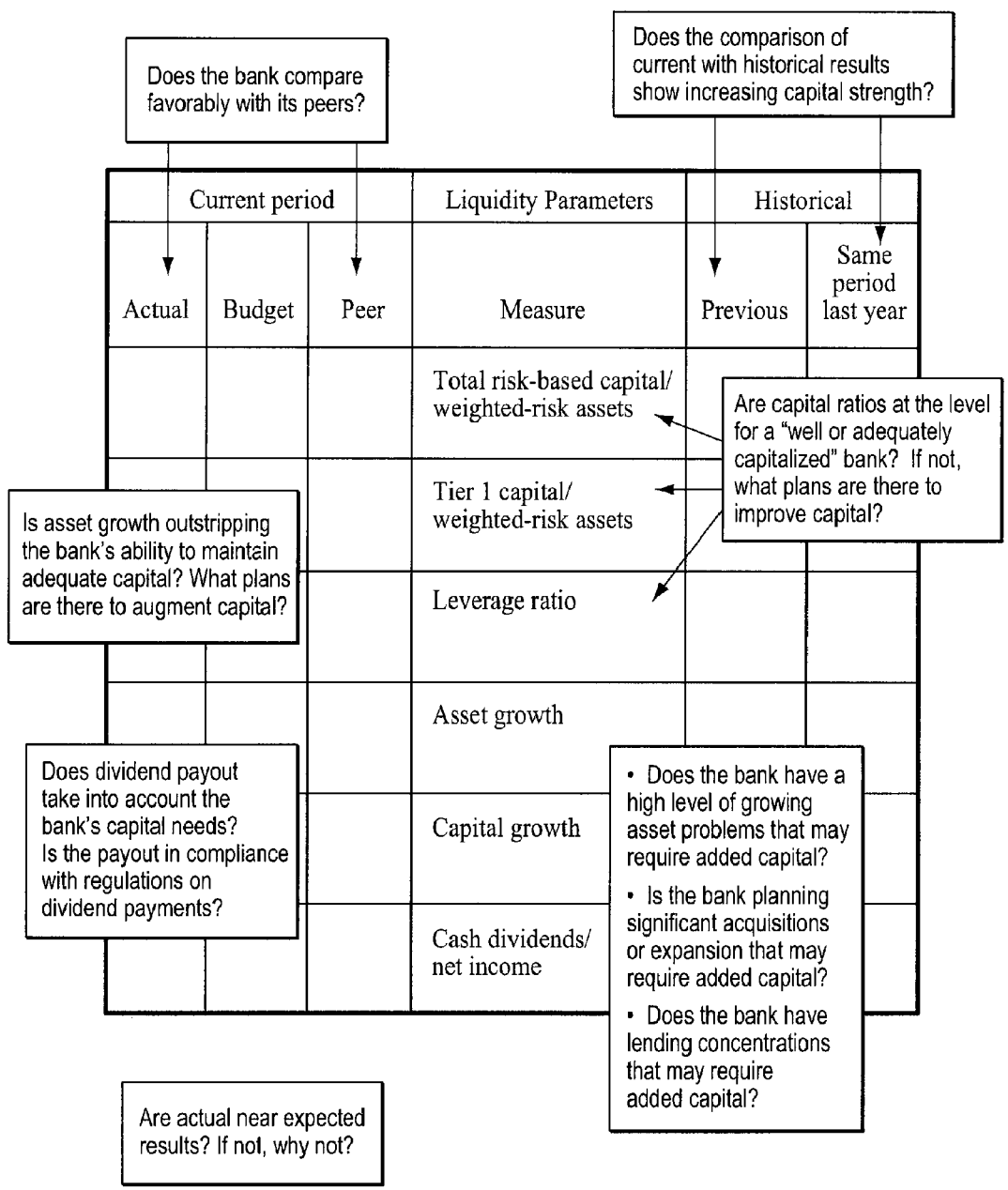
FIG. 4 illustrates, in block diagram form, a set of criteria relating to Lender Capitol Ratio Analysis.

Risk-based capital guidelines divide capital into core and supplemental capital. FIG. 4 illustrates, in block diagram form, a set of capital measures relating to Lender Capital and the various inputs required to perform these analyses. Core or Tier 1 capital is similar to what is normally thought of as capital in other businesses. It consists of common and certain preferred stock, surplus, and undivided profits. Supplemental or Tier 2 capital consists, within certain specified limits, of such things as the allowance for loan losses (although the extent to which this allowance in particular may be included in the risk-based capital calculations is severely limited), hybrid capital instruments, and subordinated debt. These supplemental items are often forms of debt that are subordinate to claims of depositors and the FDIC. As such, they provide depositor protection and are included in Lender Capital. The sum of Tier 1 and Tier 2 capital, less certain deductions, represents a Lender's total capital. In the capital guidelines, Tier 1 capital must constitute at least 50% of a Lender's total capital. Thus, the use of Tier 2 capital is limited by the "hard" equity in a Lender's Capital structure.

In reviewing a portfolio of existing loans, the Lender Capital Parameters listed in FIG. 4 use the identified Loan and Deposit data to enable the CapStratix System to chart the Lender Capital Parameters for various periods of time. These computed Lender Capital Parameters are indicators of the financial health of the Lender and are pertinent to the determination of which and how many loans in the existing loan portfolio should be restructured.

Asset Quality

Asset quality refers to the amount of risk or "probable" loss in a Lender's assets and the strength of management processes to control that risk. Where these losses are judged to be small or unlikely, and management processes are strong, asset quality is considered good. Where losses are large or likely, and management processes are weak, asset quality is considered poor.

A Lender can suffer losses in many categories, but its portfolio of Loans represent the predominant locus of risk—most Lender failures occur because of loan problems, which is why the greatest concern of regulators, particularly in the current market, is with respect to credit quality in a Lender's loan portfolio. FIG. 4 illustrates, in block diagram form, a set of measures relating to Lender Asset Quality Ratio Analysis and the various data inputs required to perform these analyses.

Figure 5:
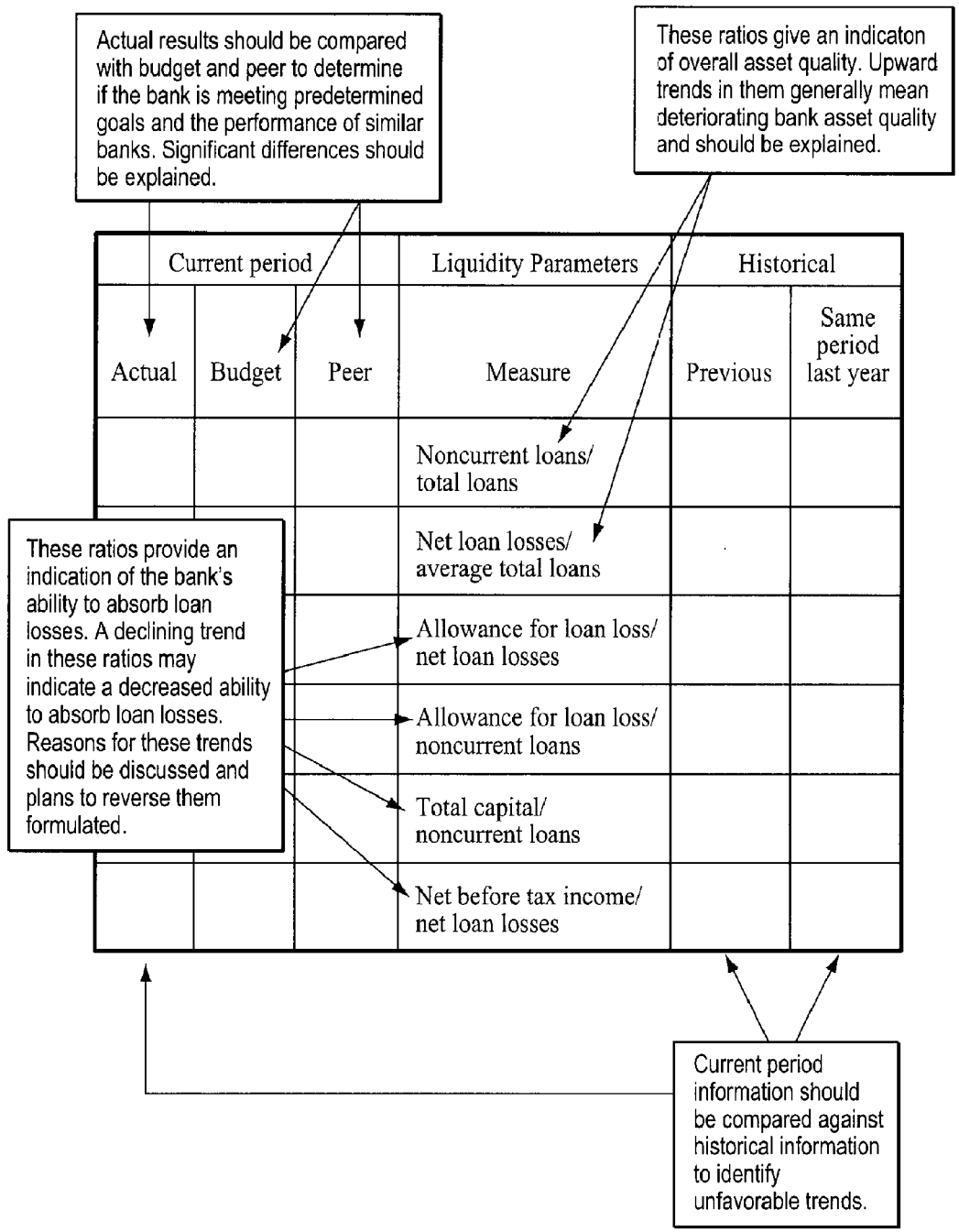
FIG. 5 illustrates, in block diagram form, a set of criteria relating to Lender Asset Quality Ratio Analysis.

In reviewing a portfolio of existing loans, the Capitol Ratio Measures listed in FIG. 5 use the identified Lender Loan and Payment data to enable the CapStratix System to chart the Asset Quality Measures for various periods of time. These computed Asset Quality Measures are indicators of the financial health of the Lender and are pertinent to the determination of which and how many loans in the existing loan portfolio should be restructured.

Earnings Quality

Earnings Quality refers to the composition, level, trend, and stability of Lender profits. FIG. 6 illustrates, in block diagram form, a set of measures relating to Lender Earnings Analysis and the various data inputs required to perform these analyses. For a Lender's directors and managers, Earnings Quality represents a "financial report card" on how well the Lender is doing. When Earnings Quality is good, the Lender has sufficient profits to support operations, provide for asset growth, and build capital. Profits grow over time and show little variability. Moreover, depositors are given an extra margin of protection and shareholders receive a competitive return on their investment. On the other hand, when Earnings Quality is poor, the Lender may not be able to adequately serve the credit needs of the community, provide for losses, or build capital. Moreover, depositors may be at greater risk and shareholder returns may be inadequate.

In reviewing a portfolio of existing loans, the Lender Earnings Measures listed in FIG. 6 use the identified Lender Earnings and Losses data to enable the CapStratix System to chart the Earnings Measures for various periods of time. These computed Earnings Measures are indicators of the financial health of the Lender and are pertinent to the determination of which and how many loans in the existing loan portfolio should be restructured.

Sensitivity to Market Risk

Sensitivity to market risk refers to the risk to a Lender's earnings or capital position resulting from changes in market rates or prices, such as interest rates, equity prices, commodity prices, or foreign exchange rates. For some large institutions, foreign operations can be a significant source of market risk. Trading activities, where the institution buys and sells for its own account hoping to profit on price movements, also can be a significant source of market risk for some. For most Lenders, however, the primary source of market risk stems from interest rate changes and their effects on Lender earnings and capital.

CapStratix System

The CapStratix System 100 organizes the disaggregation of a designated portfolio of Mortgage Loans (also termed "existing loans") held by either a single Lender or a syndicate of such Lenders (in either case, the "Lender"). Each Mortgage Loan is converted into discrete note amounts, including at least an A Note and a "RenuNote", with the complete set of notes being secured by the same mortgage lien. The purpose of the disaggregation function of the CapStratix System includes, without limitation:

1. to facilitate the extension of each Loan's maturity at new market pricing, without reliance on any other Lender originating a replacement loan using new funds;
2. to have a positive effect on a Lender's regulatory capital achieved by close concordance with all Regulations;
3. to make more efficient use generally of the Lender's Tier 1 and Tier 2 capital and, in particular, of the Lender's established total loan loss reserves;
4. to avoid any significant change to the Borrower's ownership structure or its total risk exposure; and
5. to achieve efficient pricing of the risk encompassed in the RenuNote by matching the Lender's risk specific to each RenuNote to an appropriate risk counterparty among the Investors.

The CapStratix System determines the amount, the terms, and the price of a RenuNote to be sold to Investors. Each RenuNote amount, terms, and conditions are determined to be compatible with its related A Note and within each Whole Loan, the term of which is to be extended (an "Xtended Loan").

As can be seen from the above discussion and the parameters and measures denoted in FIGS. 3-6, the identification of existing Loans which are suitable candidates for restructuring through the CapStratix system is dependent on the present state of the Lender and the various parameters and measures that should be considered in the computations performed by the CapStratix System 100, thereby significantly increasing the complexity of the underlying computations.

FIG. 1 illustrates, in block diagram form, the overall architecture of the present CapStratix System 100 which operates on one or more portfolios (111-112) of existing Loans held by Lenders, each portfolio (111) consisting of one or more existing loans (121-1 to 121-N) and their associated loan data, as described below. In addition, the present CapStratix System 100 contains one or more Investor groups (131-132), each Investor group (131) consisting of one or more sources of capital (141-1 to 141-M) at least one available pool of capital, for use in conjunction with a plurality of the existing Loans listed in the portfolios of existing loans (111, 112, . . .) and their associated investment data, as described below. These last-mentioned entities represent inputs to the CapStratix System 100 which also includes the provision to receive additional data in the form of parameters, options, limits, and the like, as described below, which are stored in parameter database (103).

Figure 2:
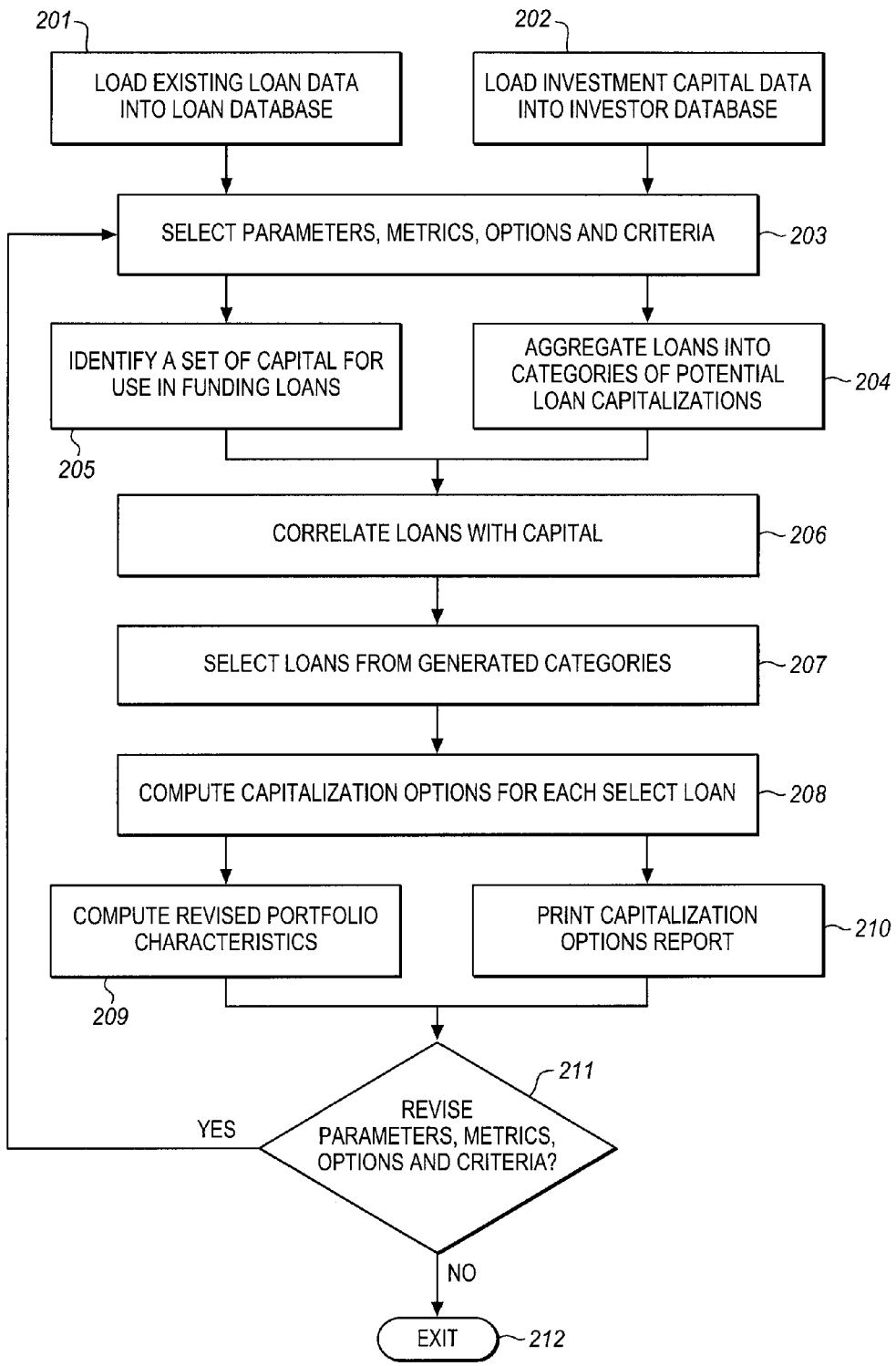
FIG. 2 illustrates, in flow diagram form, the basic operation of the CapStratix System.

FIG. 2 illustrates, in flow diagram form, the basic operation of the CapStratix System 100. The CapStratix System 100 consists of a number of databases, which can be implemented as a single physical database, but are shown as separate databases for the purpose of illustration of the various sets of data which are relevant to the operation of this system. A loan database 101 stores data which defines a plurality of loan instruments, held by at least one regulated entity, as well as the loan related collateral and associated Borrower data. At step 201, the CapStratix System 100 receives this loan data and stores the data in loan database 101. The loan data includes a number of parameters and characteristics, which can relate to the Lender or the Borrower, or the property which secures the loan, as described below.

The Investor database 102 stores Investment Capital data which defines at least one available pool of capital for use in conjunction with a plurality of the existing loans listed in the loan database 101. At step 202, the CapStratix System 100 receives this Investment Capital data and stores the data in investor database 102. The investor data includes a number of capitalization criteria, such as amount of capital, required return on investment, and category of loans (by collateral type, location, size, degree of distress, and the like).

The data which populates the Loan database 101 and the Investor database 102 are obtained from the associated one or more portfolios 111-112 of existing loans and the one or more Investors 131-132, respectively. In addition, a parameter database 103 provides data which is used to define the various capitalization criteria and options, as well as loan parameters, Borrower characteristics, Lender data, and the like (see FIGS. 3-6). The data stored in these databases are used by the supplemental note processor 104 to create a capitalization options report 151 which is delivered to a user via user interface 105.

In particular, at step 203, the user would select a plurality of metrics to be considered from all of the data stored in the parameter database, the characteristics of the existing loans to be considered, and the characteristics of the Investment Capital. These metrics represent limits to be applied to the computation process to constrain the possible results to comply with the requirements of the Lender, Investor, Regulator, and Borrower.

For example, at step 204, the existing loans can be sorted into categories as defined in the above step by the selection of the appropriate metrics. Thus, the existing loans can be constrained into residential loans and/or commercial loans, or further parsed by maturity date, location of the collateral property, Borrower characteristics, age of the structure placed on the property, loan payment history, etc. These compilations would also correspond to threads of Investment Capital that are identified at step 205 in this aggregation process, to enable the CapStratix System 100 to correlate Investment Capital with categories of Existing Loans at step 206 so that, at step 207, a subset of existing loans can be selected from the generalized categories to match with available Investment Capital in order to properly define the RenuNotes that can be generated as a means to restructure the risks specific to these selected existing loans.

At step 208, the CapStratix System 100 computes at least one and more typically a plurality of capitalization options for each selected existing loan as identified at step 207. These capitalization options are collated and printed as a report at step 210 to enable a user to review the proposed RenuNotes and optionally, at step 211, revise any of the parameters, metrics, options, and criteria as described herein to provide an alternate view of the possible capitalization options, where the process is reiterated at step 203, using the revisions input by the user until the final report is accepted at step 210 and processing exits at step 212. In addition, at step 209, the CapStratix System 100 can compute data indicative of revised portfolio characteristics to enable the user to identify the impact the process has on the portfolio of existing loans.

The Framework

Most of the market parameters are determined and applied by the third party appraiser in determining the projected future income and current fair market value of loan collateral. Other market parameters are key to the CapStratix System's utility in a given situation: market interest rate spread and required Investor returns. The method's success depends on the Lender and the RenuNote Investor(s) agreeing on these, as supported by competitive market data and independently endorsed by Regulators.

The Main Iterative Loop

Within this framework of parameters, the first variable for Lender and Investor to agree on will be an appropriate new maturity date for the Xtended Loan, i.e., a date that is likely to fall within a period of positive economic growth, when there will be a greater supply of mortgage capital, available at lower capital costs. The method allows for the parties to iterate back to Term as necessary to complete the RenuNote determination.

The more arbitrary negotiated variables are the respective shares of the fee and spread allocated to A Note (Lender) and RenuNote (Investor). The CapStratix System 100 algorithm accommodates a wide range of variables; but for any set of variables assigned to the allocations and Term of the Xtended Loan agreed upon, the RenuNote Discount automatically responds to complete the restructuring. The CapStratix System 100 determines a discount that is optimum for the Lender, consistent with Regulations, by accounting precisely for any allocation to the RenuNote of loan risk and loan economics over the Xtended Loan term. By determining each Loan's RenuNote risk and matching it with new capital from a suitable risk counterparty in a highly organized and transparent restructuring process, the CapStratix System 100 makes more capital available to the mortgage loan market at competitive market pricing. This reduces the Lender's risk profile, reduces the Borrower's cost of capital in the market relative to the cost of capital when the market relies on CMBS bond Investors, stabilizes and supports the value of collateral properties, and can minimize or preclude the need for government funding as part of the Investor group. The system also can minimize or preclude the need for government and Regulator oversight of the Lender by helping to establish adequate risk-based capital for the Lender.

The supplemental note processor 104 is responsive to the loan database 101, the capitalization database 102, and the collateral database 103, allowing for parameters, options, criteria, and negotiated metrics to be processed in various combinations to provide at least one, and conveniently an array, of capitalization options for each of at least two notes. The data required is flexibly reported by the note processors 104, showing combinations of input from the databases, such as FIGS. 7A and 7B.

The supplemental note processor 104, as shown in FIGS. 7A-13B, calculates:
1. The current fair market value ("FMV") of the collateral based on a selection of valuation methods, including:
   (a) a direct income capitalization approach as shown below, i.e., dividing an annual income amount, actual or projected, by the market capitalization rate, or
   (b) a discounted cash flow approach as shown below, i.e., by calculating the net present value at the periodic discount rate from the collateral database, of projected periodic cash flows, together with the projected future value of the collateral as of the Xtended Loan maturity date, or
   (c) is provided a direct value input, based on a third-party appraisal report using either approach or a combination thereof;
2. The current LTV ratio as the current loan amount divided by the current fair market value of the collateral;
3. The RenuNote amount as the difference between the targeted A Note, calculated as the product of: the current FMV of the collateral times the targeted LTV ratio from the capitalization database, and the current loan amount;
4. The current interest rate as the sum of the current interest rate index plus the current interest rate spread;
5. The current interest payment as the product of the loan amount, times the current interest rate;
6. The current interest payment as the sum of interest payments on each of the notes if the loan amount comprises more than one note;
7. The total current interest payment on the loan available to the RenuNote, reflecting the relative risk profiles of the various notes and related negotiation, as the product of the A Note's share percentage of the RenuNote spread (a negotiated variable), times the RenuNote spread;
8. The respective shares of the Xtension fee, between the A Note, any other senior notes, and the RenuNote based on the relative risk profiles of the various notes and related negotiation, as the product of the various notes' share percentage of the Xtended Loan spread, times the Xtended loan spread, an amount which is then compared to the minimum required current return to Investor;
9. The total projected fee and interest income to the RenuNote, by period for the Xtended Loan term, an input determined as a market parameter, such total being the sum of amounts calculated as noted in 7 above plus amounts calculated as noted in 8 above;
10. The total projected payoff to the RenuNote at maturity, as the lesser of the face amount of the RenuNote, and the projected future value as of the final Xtended Loan maturity date;
11. The total net cash flow by period through the Xtended Loan term, projected to be received by the RenuNote holder, as the sum of items 9 and 10 above;
12. The present value of the cash flow stream resulting from the calculation of 11 above, using a periodic discount rate available to the processor from the capitalization database;
13. The required RenuNote discount calculated as the difference between the RenuNote amount, calculated as item 3 above, and the present value calculated as item 12 above; and
14. The net additional loan profit or loss to be recognized by the Lender concomitant with closing of the Xtended Loan closing, as the difference between the allocable loan loss reserve already established as a ledger account on the Lender's books, such amount available to the processor as a parameter in the loan database and the RenuNote discount calculated as item 13 above.

The supplemental note processor 104 provides the capacity to make any number of iterations through the above-listed calculations, to allow for a balancing of the outcomes for the parties across a plurality of loans within a transaction, such concurrent iterations to include possible combinations of the various inputs, variables, and negotiated amounts included in the several information databases available to the processor.

Relative to the calculations described above, if the interests of all parties to the transaction were not appropriately or agreeably balanced in the results of an initial iteration, the processor is capable of making instantaneous adjustments based on some or all of the data including any one of several variables, or any combination thereof.

For example, Lender and Investor would initially agree on extending for three years the term of a selected $50,000,000 LIBOR-indexed loan, instead of a longer new term as desired by Borrower, as illustrated by a screenshot of the input page from the note processor 104, presented as FIG. 8A. Further, in the current period, the market parameters would most likely be established as is illustrated in FIG. 8B.

Pursuant to step 1.c. described above, the note processor 104 determines the current FMV of the collateral property based on data from the loan database 101, as provided by a licensed appraiser, in the form of an appraisal meeting all regulatory requirements. In such appraisal, the appraiser would independently project the net income and cash flow from the collateral property, then determine the current FMV of the collateral using two of the Market Parameters shown: Discount Rate and Residual Cap Rate. The note processor 104 reports a summary of the appraiser's valuation, in this example $45,022,447, based on data available in the loan database, as shown in FIG. 9.

Based on information available in the loan database 101, the note processor 104 calculates a LTV ratio, in this example 111.1%, as described in step 2 above. (The System operates across a full range of LTV ratios.) This results in a determination of the RenuNote Amount, $18,484,287, as described in step 3 above, and shown in FIG. 10.

The note processor 104 concurrently calculates the Xtended Loan interest rate, as described in step 4 above, and shown in FIG. 11.

In steps 5, 6, and 7 above, the note processor 104 makes various calculations to determine total interest on the Extended Loan, as well as the shares allocated to each Note, as shown in FIGS. 12A and 12B.

Steps 8 through 13 above are accomplished by the note processor 104, and shown in FIG. 13A.

As an example of the iterative loop provided by the note processor 104, it is conceivable that the Lender does not have a loan loss reserve of $4,425,648 as shown in the example above, and is not prepared to take an additional reserve amount from current income. Based on data available to the system in the Investor database, the note processor 104 would show Lender a reallocation of the Xtension fee to the RenuNote Investor and the Senior Note share of the interest spread, the range of such possibility being responsive to other database information, e.g., regulations defining the minimum interest rate on the A Note without triggering impairment charges under GAAP. Such iterations would result in a further reduction of the RenuNote discount requirement, to $4,030,048, as shown in FIG. 13B.

The CapStratix System 100 provides a fully defined set of algorithms to determine the A Note and the RenuNote amounts for each loan capitalization in an objectively designated portfolio of loans. For each loan capitalization, the relative pricing of both notes, in terms of the share of fees and interest each note holder (Lender and Investor) would be paid from the total fee and total interest, and the amount, if any, of discount required to provide the total return sufficient to justify an unregulated Investor's cash purchase of the RenuNote, must be computed. These interrelated algorithms are an essential part of the method whereby the institutional Lender can limit and mitigate the adverse economic impacts noted, all while maintaining a productive and profitable continuing position in the credit market. These algorithms are incorporated in a model that guides the execution of the CapStratix System 100. Thus, there is a certain amount of coupling between the Lender and Investor, since their respective needs and/or desires are interrelated in determining the terms of the loan capitalization. These two parties are independent entities and can negotiate between themselves for a mutually acceptable set of terms and conditions which satisfies their respective transaction parameters in accordance with all Regulations.

Although exemplary implementations have been described in detail above, those skilled in the art will readily appreciate that many additional modifications are possible in the exemplary embodiments without materially departing from the novel teachings and advantages of the herein-described systems and methods. Accordingly, these and all such modifications are intended to be included within the scope of the herein-described systems and methods. The herein-described systems and methods may be better defined by the following claims.

What is claimed as new and desired to be protected by Letters Patent of the United States is:

1. A system for automatically compiling a plurality of existing mortgage loans for intra-loan restructuring of risk via capital infusion and dynamic resetting of mortgage loan terms and conditions, comprising:
   a mortgage loan physical database for storing data which defines a plurality of mortgage loan instruments, held by at least one regulated entity, as well as the mortgage loan related collateral and associated Borrower data;
   an investor physical database which defines at least one available pool of capital for use in conjunction with a plurality of said existing mortgage loans listed in said mortgage loan database;
   a supplemental note processor, responsive to said mortgage loan database and said investor database, for identifying at least one capitalization option for each of at least two of said existing mortgage loans; and
   wherein said supplemental note processor further comprises:
      a RenuNote calculator for disaggregating an existing mortgage loan into discrete note amounts, including at least an A Note calculated as the product of the current Fair Market Value (FMV) of the collateral times the Loan-To-Value (LTV) ratio from said capitalization database, and at least one RenuNote, calculated as the difference between said A Note and the current loan amount, all such notes secured by the same mortgage lien.

2. The system for automatically compiling a plurality of existing mortgage loans for restructuring of claim 1 wherein said supplemental note processor comprises:
   a mortgage loan category aggregator which creates a thread of said mortgage loans by selecting existing mortgage loans from said mortgage loan database according to at least one metric from the class of mortgage loan metrics including: collateral type, location of property, size of mortgage loan, Borrower characteristics, and degree of distress of existing mortgage loan.

3. The system for automatically compiling a plurality of existing mortgage loans for restructuring of claim 2 wherein said supplemental note processor further comprises:
   a capital correlator for identifying a set of capital from said pool of capital identified by said capitalization database for use in funding mortgage loans.

4. The system for automatically compiling a plurality of existing mortgage loans for restructuring of claim 1 wherein said supplemental note processor further comprises:
   a portfolio composite calculator, responsive to said RenuNote calculator, for computing at least one financial characteristic of said portfolio of existing mortgage loans indicative of a change in characteristics of said portfolio of existing mortgage loans.

5. The system for automatically compiling a plurality of existing mortgage loans for restructuring of claim 2 wherein said investor database stores investor data relating to asset characteristics and capital parameters including: amount of capital, required return on investment, category of loans by collateral type, location, size, degree of distress.

6. The system for automatically compiling a plurality of existing mortgage loans for restructuring of claim 5 wherein said supplemental note processor further comprises:
   a characteristic correlator for correlating metrics of said existing loans with investor data comprising asset characteristics and capital parameters; and
   an existing mortgage loan selector for selecting a plurality of mortgage loans in said thread of mortgage loans for funding by said set of capital from said pool of capital identified by said capitalization database.

7. A method of automatically compiling a plurality of existing mortgage loans for intra-loan restructuring of risk via capital infusion and dynamic resetting of mortgage loan terms and conditions, comprising:
   operating a mortgage loan physical database for storing data which defines a plurality of mortgage loan instruments, held by at least one regulated entity, as well as the mortgage loan related collateral and associated Borrower data;
   operating an investor physical database which defines at least one available pool of capital for use in conjunction with a plurality of said existing mortgage loans listed in said mortgage loan database;
   identifying, using a supplemental note processor which is responsive to said mortgage loan database and said investor database, at least one capitalization option for each of at least two of said existing mortgage loans; and
   disaggregating an existing mortgage loan into discrete note amounts, including at least an A Note calculated as the product of the current Fair Market Value (FMV) of the collateral times the Loan-To-Value (LTV) ratio from said capitalization database, and at least one RenuNote, calculated as the difference between said A Note and the current loan amount, all such notes secured by the same mortgage lien.

8. The method of automatically compiling a plurality of existing mortgage loans for restructuring of claim 7 wherein said step of identifying comprises:
   creating a thread of said mortgage loans by selecting existing mortgage loans from said mortgage loan database according to at least one metric from the class of mortgage loan metrics including: collateral type, location of property, size of mortgage loan, Borrower characteristics, and degree of distress of existing mortgage loan.

9. The method of automatically compiling a plurality of existing mortgage loans for restructuring of claim 7 wherein said step of identifying further comprises:
identifying a set of capital from said pool of capital identified by said capitalization database for use in funding mortgage loans.

10. The method of automatically compiling a plurality of existing mortgage loans for restructuring of claim 7 wherein said step of identifying further comprises:
computing, in response to said RenuNote calculator, at least one financial characteristic of said portfolio of existing mortgage loans indicative of a change in characteristics of said portfolio of existing mortgage loans.

11. The method of automatically compiling a plurality of existing mortgage loans for restructuring of claim 7 wherein said investor database stores investor data relating to asset characteristics and capital parameters including: amount of capital, required return on investment, category of loans by collateral type, location, size, and degree of distress.

12. The method of automatically compiling a plurality of existing mortgage loans for restructuring of claim 11 wherein said step of computing comprises:
correlating metrics of said existing loans with investor data comprising asset characteristics and capital parameters.

13. The method of automatically compiling a plurality of existing mortgage loans for restructuring of claim 8 wherein said investor database stores investor data relating to asset characteristics and capital parameters including: amount of capital, required return on investment, category of loans by collateral type, location, size, and degree of distress, and said step of identifying further comprises:
correlating metrics of said existing loans with investor data comprising asset characteristics and capital parameters; and
selecting a plurality of mortgage loans in said thread of mortgage loans for funding by said set of capital from said pool of capital identified by said capitalization database.

* * * * *